United States Patent [19]

Seong

[11] Patent Number: 5,781,688

[45] Date of Patent: Jul. 14, 1998

[54] METHOD AND APPARATUS FOR REPRODUCING A COMPRESSED DIGITAL VIDEO SIGNAL AT MULTIPLE SPEED

[75] Inventor: Goan-soo Seong, Seoul, Rep. of Korea

[73] Assignee: Samsung Electronics Co., Ltd., Kyungki-do, Rep. of Korea

[21] Appl. No.: 736,484

[22] Filed: Oct. 24, 1996

[30] Foreign Application Priority Data

Oct. 24, 1995 [KR] Rep. of Korea ............... 95-36840

[51] Int. Cl.[6] .................................................. H04N 5/91
[52] U.S. Cl. ........................................ 386/79; 386/80
[58] Field of Search ............................ 386/79, 80, 78, 386/73, 69, 71, 72, 85, 86, 87, 88, 6, 14, 16, 17, 41; 360/73.01; H04N 5/91

[56] References Cited

U.S. PATENT DOCUMENTS

| | | | |
|---|---|---|---|
| 5,065,385 | 11/1991 | Konno | 369/50 |
| 5,172,239 | 12/1992 | Nakayama et al. | 386/79 |
| 5,490,017 | 2/1996 | Nakamura et al. | 386/79 |
| 5,532,835 | 7/1996 | Nakagaki et al. | 386/79 |

*Primary Examiner*—Robert Chevalier
*Attorney, Agent, or Firm*—Sughrue, Mion, Zinn, Macpeak & Seas

[57] ABSTRACT

A multiple speed reproduction method and apparatus records a multiple speed reference signal to enable a head to accurately scan the position where an I frame is recorded during a multiple speed reproduction. The method and apparatus controls a duty ratio of a control signal which is recorded on a control track, and reproduces the multiple speed reference signal for use by a servo system during the multiple speed reproduction.

9 Claims, 4 Drawing Sheets

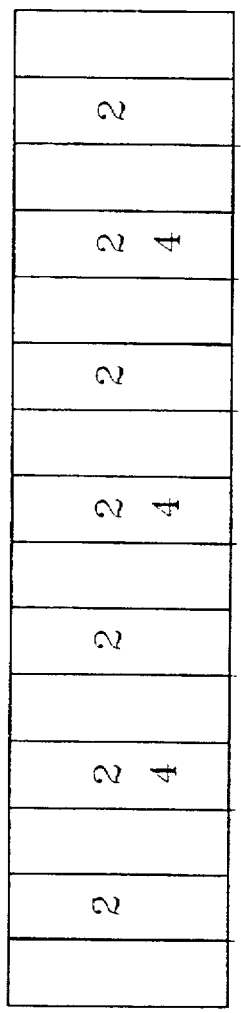
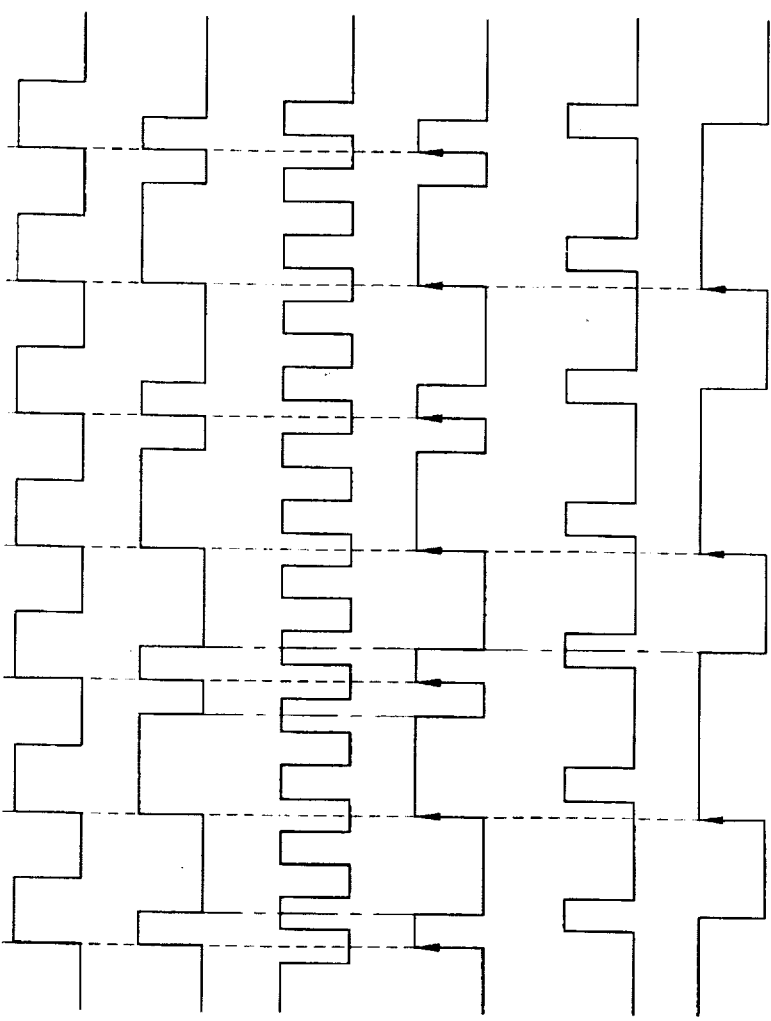
FIG. 1A
FIG. 1B
FIG. 1C
FIG. 1D
FIG. 1E
FIG. 1F
FIG. 1G

METHOD AND APPARATUS FOR REPRODUCING A COMPRESSED DIGITAL VIDEO SIGNAL AT MULTIPLE SPEED

BACKGROUND OF THE INVENTION

The present invention relates to a method and apparatus for reproducing a compressed digital video signal at multiple speed.

To fully realize the benefits of a satellite digital broadcasting system, a video system capable of recording and reproducing both an analog video signal and a digital video signal using a VHS system has been needed. Such a video system would perform a multiple speed reproduction in the following manner. When digital data is compressed and recorded based on the MPEG II standard, data is reproduced at the multiple speed reproduction as an I frame which is compressed without using correlation between previous and following frames. That is, the I frame is hierarchically recorded on a predetermined position of a track and is reproduced after the predetermined position is ascertained during the multiple speed reproduction. For example, if the number of multiple speeds is limited to 1, 2, 4, 8 and 16, a position where a head scans is overlapped according to each multiple speed at the location where data is hierarchically recorded. Here, the most important first and second hierarchies are recorded on a portion overlapping the 16 times speed, while the second most important hierarchy is recorded on a portion which overlaps the 8 times speed area but does not overlap the 16 times speed area.

In the above-described method, the most important thing is to accurately find out a predetermined position of a track on which an I frame is recorded, according to the number of each multiple speed at the time of the multiple speed reproduction. A digital VCR performs differently from an analog VHS VCR. In a digital VCR, a head should accurately scan a position where data is recorded in correspondence to the multiple speed reproduction. For doing so, the head should be phase-controlled so that the head starts accurately from a predetermined position.

A conventional SD format does not provide a control track, but has a type of pilot tone recorded on a track by 24–25 modulation, by which a phase control is performed according to an automatic track finding (ATF) operation. At the time of multiple speed reproduction, a phase error is detected and phase-controlled using a data aided trick play track phase error detector, to thereby enable a head to start at a desired position.

SUMMARY OF THE INVENTION

It is an object of the present invention to provide a multiple speed reproduction method and apparatus for recording and reproducing compressed digital data based on an MPEG standard, in which a duty ratio of a control signal which is recorded on a control track of a tape is changed to record a phase reference signal for a multiple speed reproduction, and the recorded phase reference signal is detected at the time of the multiple speed reproduction to accurately detect an I frame which has been recorded at a predetermined position. In the present invention, a width of the control signal which is recorded on the control track is varied in accordance with the multiple of the multiple speed, thereby recording a phase reference signal for a multiple speed reproduction.

To accomplish the above object of the present invention, there is provided a multiple speed reproduction method for a compressed digital video signal, the multiple speed reproduction method comprising the steps of:

altering a duty ratio of a control signal which is recorded on a control track according to the position of an I frame which is hierarchically recorded on a track;

generating a phase reference signal for a multiple speed reproduction which becomes a reference point where a head starts at the time of the multiple speed reproduction;

recording the phase reference signal for the multiple speed reproduction on the control track;

reproducing the phase reference signal for the multiple speed reproduction at the time of the multiple speed reproduction; and detecting a phase of the phase reference signal for the multiple speed reproduction using a sync reference signal of a drum.

According to the present invention, there is also provided a multiple speed reproduction apparatus for a compressed digital video signal, the multiple speed reproduction apparatus comprising:

a pattern generator portion for receiving a recording start signal and a control signal, altering a duty ratio of a control signal, generating a phase reference signal for a multiple speed reproduction which becomes a reference point where a head starts at the time of the multiple speed reproduction, and recording the phase reference signal for the multiple speed reproduction on the control track;

a multiple speed reference signal reproduction portion for reproducing the phase reference signal for the multiple speed reproduction at the time of the multiple speed reproduction; and a phase detection portion for receiving the phase reference signal for the multiple speed reproduction which is reproduced by the multiple speed reference signal reproduction portion and a drum phase reference signal, and detecting a phase of the phase reference signal for the multiple speed reproduction.

BRIEF DESCRIPTION OF THE DRAWINGS

The preferred embodiments are described with reference to the drawings wherein:

FIGS. 1A through 1G show a multiple speed reference signal which is recorded and reproduced according to the present invention in case of a double speed and a four-times speed.

DETAILED DESCRIPTION OF THE PREFERRED EMBODIMENTS

A preferred embodiment of the present invention will be described below in more detail with reference to the accompanying drawings.

A phase reference signal for a multiple speed reproduction (hereinafter referred to as a multiple speed reference signal) which is generated by varying a duty ratio of a control signal in the present invention will be described below.

FIG. 1A represents the positions of the I frame data which is recorded on a track with respect to a double speed and a four-times speed, respectively. FIG. 1B is a control signal which is recorded on an existing control track. In a method of the present invention, a control signal having a 25% duty ratio at the position where double speed data is recorded and a 75% duty ratio at the position where double speed data and four-times data overlaps, is recorded on a control track as shown in FIG. 1C. During the double speed reproduction, the above recorded control signal is reproduced and a multiple speed reference signal is generated according to each multiple speed, using a window signal associated with the multiple of each multiple speed. If the level of the multiple speed reference signal (as shown, for example, in FIG. 1C) is allowed to drop only when the corresponding window for each multiple speed is open, a multiple speed reference signal according to each multiple speed can be obtained.

FIG. 1D represents a window signal associated with a double speed reproduction. If the level of the multiple speed reference signal shown in FIG. 1C is allowed to drop only when the window for the double speed of FIG. 1D is open, a multiple speed reference signal for the double speed shown in FIG. 1E can be obtained. If a rising edge of the multiple speed reference signal for the double speed shown in FIG. 1E is used to control the phase of a head, it can be seen that the position where the double speed data is recorded can be found.

FIG. 1F represents a window signal for the four-times speed. If the level of the multiple speed reference signal shown in FIG. 1C is allowed to drop only when the window for the four times speed of FIG. 1F is open, a multiple speed reference signal for the four-times speed shown in FIG. 1G can be obtained. If a rising edge of the multiple speed reference signal for the four-times speed shown in FIG. 1G is used to control the phase of a head, it can be seen that the position where the four-times speed data is recorded can be found.

Figure 2:
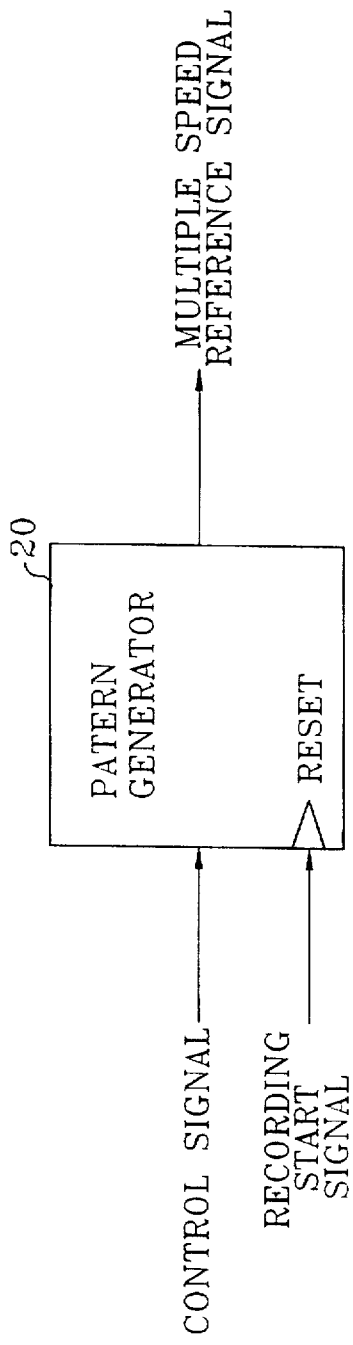
FIG. 2 shows a pattern generator for generating a multiple speed reference signal according to the present invention.

FIG. 2 shows a pattern generator for generating the above-described multiple speed reference signal according to the present invention. The pattern generator 20 shown in FIG. 2 receives a recording start signal and a control signal having a predetermined period and generates a multiple speed reference signal. The pattern generator 20 sequentially alters a duty based on a predetermined sequence. For example, the multiple speed reference signals for the double speed and the four-times speed shown in FIG. 1C outputs a pulse having a 25% duty at a rising edge of the control signal shown in FIG. 1B, and outputs a pulse having a 75% duty at the following rising edge. Such an alternate pulse output is repeated.

Figure 3:
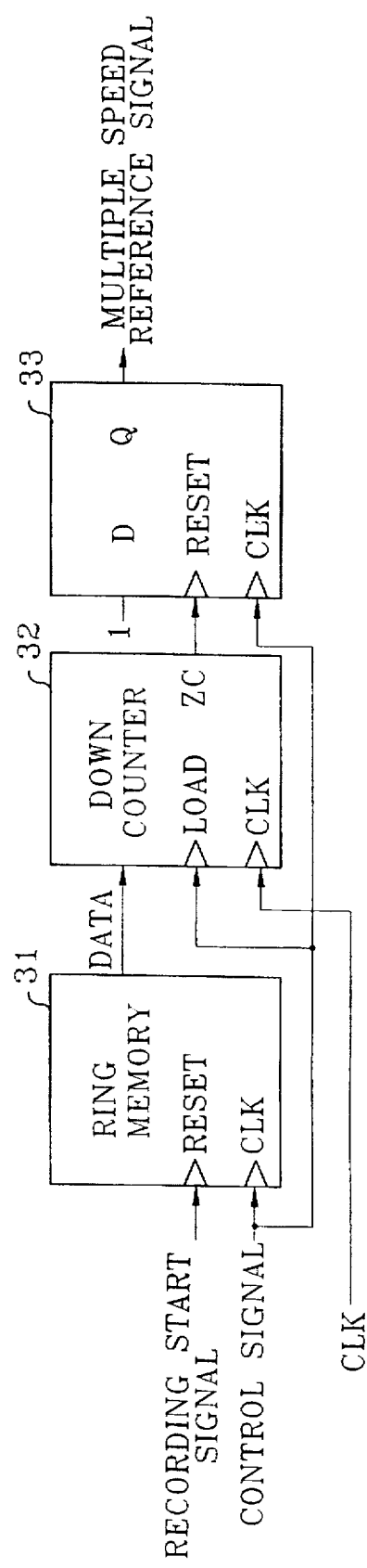
FIG. 3 is a detailed block diagram specifically embodying the pattern generator shown in FIG. 2.

FIG. 3 is a detailed block diagram of a specific embodiment of the pattern generator shown in FIG. 2. A ring memory 31 is reset by a recording start signal, and receives a control signal as a clock input. Accordingly, the ring memory 31 increases an address at every rising edge of the control signal and cyclically outputs the stored multiple speed information in sequence. Taking FIGS. 1A through 1G as an example, the multiple speed information with respect to the double speed and the four-times speed is stored in the ring memory and cyclically output in sequence at every rising edge of a phase sync signal, to thereby output multiple speed information such as double speed, four-times speed, double speed, four-times speed . . . . A down-counter 32 down-counts the number of predetermined clock pulses based on the rising edge of the control signal according to the multiple speed information input from the ring memory 31. Then, if the number becomes zero, the down-counter 32 outputs a pulse. The number of the predetermined clock pulses is determined by a duty according to the multiple speed information. In FIGS. 1A through 1G, if double speed information is input from the ring memory 31, the number of clock pulses is down-counted starting from a predetermined number. After about 25% of the duty of the pulse from the rising edge of the control signal has elapsed, the down-counter reaches zero, and outputs a zero pulse. The four-times speed information is input from the ring memory 31 at the following rising edge of the control signal and the number of the predetermined clock pulses is down-counted with respect to the four-times speed. When the down-counter reaches zero it outputs a zero pulse.

The output of the down-counter 32 is connected to a D flip-flop 34 which outputs '1' at a rising edge of the control signal and '0' at the zero pulse of the down-counter 32, according to the control signal and the pulse output of the down-counter 32.

In FIGS. 1A through 1G, if the multiple speed information such as double speed, four-times speed, double speed, four-times speed, . . . is repeated, the multiple speed reference signal as shown in FIG. 1C is generated.

In the pattern generator shown in FIG. 3, the clock of a crystal oscillator or a frequency generator (FG) signal of a VCR servo system can be used as the clock of the down-counter for altering the duty according to the multiple speed information. Since about 36 FG signals are output for a period of time of the control signal in the VHS system, a duty ratio can be adjusted using such FG signals.

A method for reproducing a multiple speed reference signal according to a particular multiple speed number using a multiple speed reference signal which is recorded on a control track in the same manner as the above-described, and an apparatus thereof will be described below.

Figure 4:
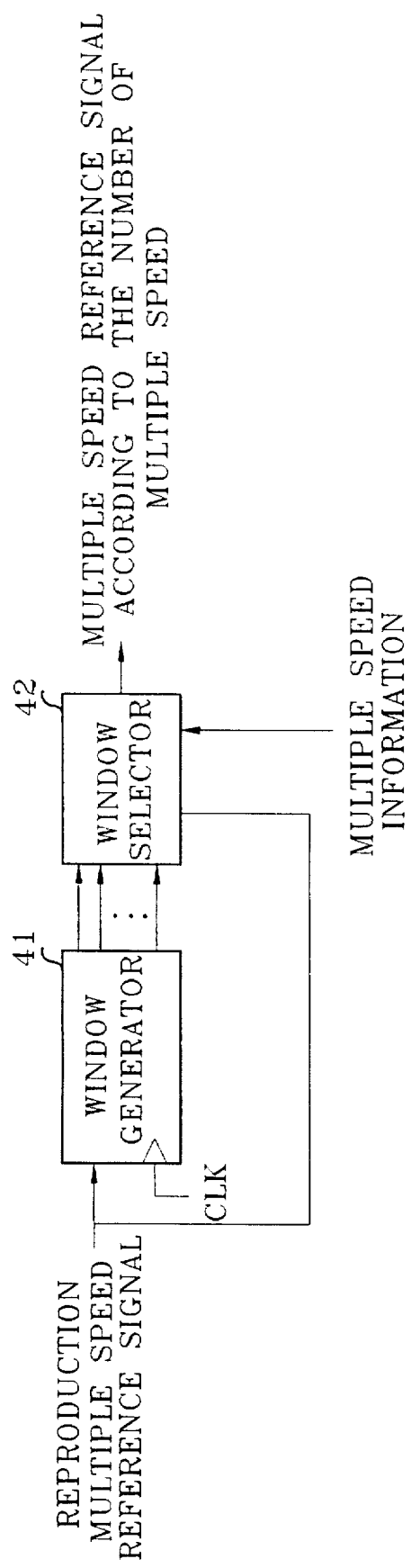
FIG. 4 is a block diagram of a multiple speed reference signal detector according to the present invention.

FIG. 4 is a block diagram of a multiple speed reference signal detector according to the present invention. A window generator 41 generates a window signal according to each multiple speed number, in such a manner that the window is open for a predetermined time after a rising edge of the multiple speed reference signal reproduced from a control track. In FIGS. 1A through 1G, the window of FIG. 1D is generated with respect to the double speed and the window of FIG. 1F is generated with respect to the four-times speed. A window selector 42 selects a window according to each multiple speed information, and detects a falling edge of the reproduced multiple speed reference signal at an interval where the window is open, to extract a multiple speed reference signal of each multiple speed. In FIGS. 1A through 1G, a falling edge of the multiple speed reference signal is detected at the interval where the window with respect to the double speed and the four-times speed is open, the multiple speed reference signal as shown in FIGS. 1E and 1G.

Figure 5:
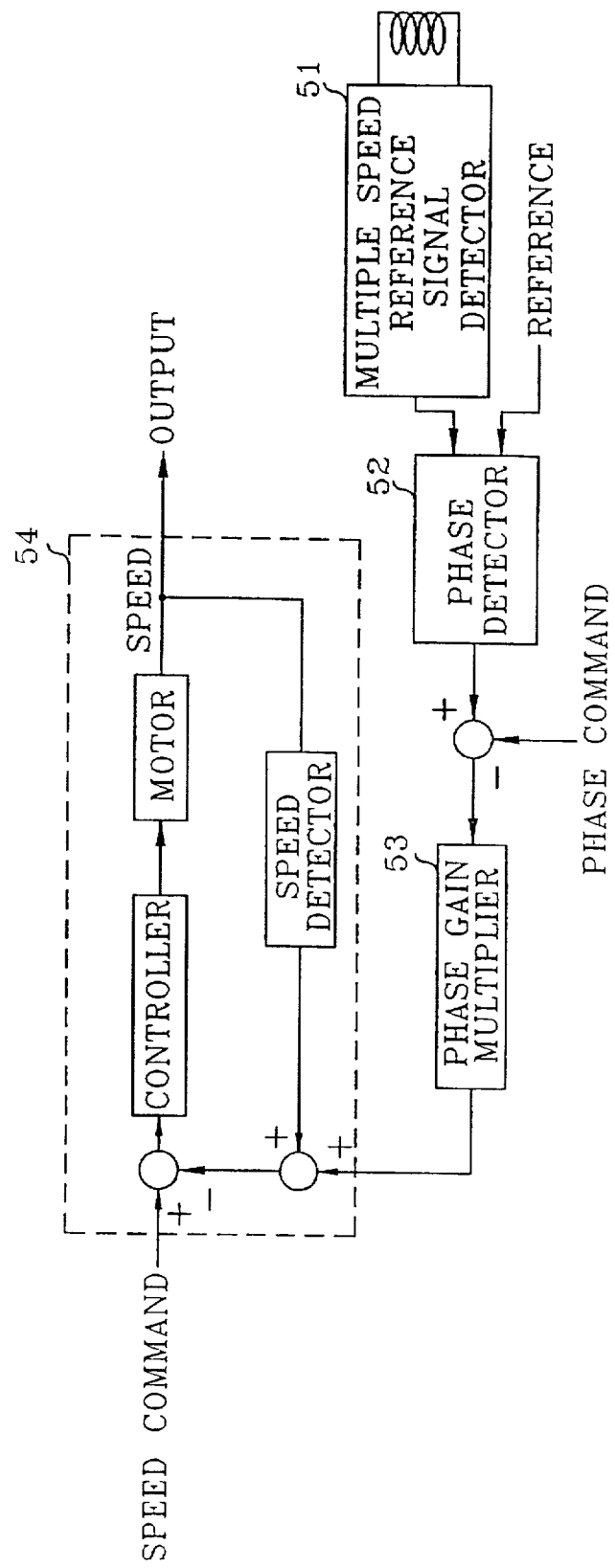
FIG. 5 is a block diagram of a capstan servo controller which uses a multiple speed reproduction method according to the present invention.

FIG. 5 is a block diagram of a capstan servo controller which uses a multiple speed reproduction method according to the present invention. A conventional divider is replaced by the multiple speed reference signal detector 51. A reference signal is a sync reference signal of a drum obtained during reproduction. For example, since N tracks are traversed for half a rotation of the drum during N-times speed reproduction, a phase detector 52 detects the phases of the sync reference signal of the drum and the multiple speed reference signal output from the multiple speed reference signal detector 51, to obtain a phase with respect to the multiple speed reference signal. A predetermined phase command is given for each multiple speed, so that the head has the maximum envelope at the place where effective information exists. Then, a phase error is obtained in a subtracter which subtracts the input phase command from the phase input from the phase detector 52. The phase error is multiplied by a phase gain in a phase gain multiplier 53. The resultant value is supplied to a speed control loop 54. In the speed control loop 54, the output of the phase gain multiplier 53 is added to the output of a speed detector which detects the speed of a motor controlled by a controller. The added result is subtracted from a speed command as an offset value, to control a phase.

As described above, the multiple speed reproduction method and apparatus according to the present invention records a multiple speed reference signal so that a head accurately scans the position where an I frame is recorded during a multiple speed reproduction, by controlling a duty ratio of a control signal which is recorded on a control track in order to use a VHS system to reproduce at a multiple speed a compressed digital video signal, and reproduces and uses the multiple speed reproduction in a servo system.

While only certain embodiments of the invention have been specifically described herein, it will be apparent that numerous modifications may be made thereto without departing from the spirit and scope of the invention.

What is claimed is:

1. A multiple speed reproduction method for a video signal, the multiple speed reproduction method comprising the steps of:

altering a duty ratio of a control signal which is recorded on a control track according to a position of an I frame which is hierarchically recorded on a track;

generating a phase reference signal for a multiple speed reproduction which indicates a start position of a head for multiple speed reproduction;

recording the phase reference signal for the multiple speed reproduction on the control track;

reproducing the phase reference signal for the multiple speed reproduction during the multiple speed reproduction; and detecting a phase of the phase reference signal for the multiple speed reproduction using a sync reference signal of a drum.

2. The multiple speed reproduction method for a video signal according to claim 1, wherein said step of reproducing the phase reference signal further comprises a step of uniquely setting the duty ratio of the control signal for each multiple of the multiple speed according to the position of the I frame which is hierarchically recorded.

3. The multiple speed reproduction method for a video signal according to claim 2, wherein said each multiple of the multiple speed is an integer and the period of the phase reference signal for the multiple speed reproduction is a period of the control signal multiplied by a number which is an integer.

4. The multiple speed reproduction method for a video signal according to claim 3, wherein the video signal is a compressed digital video signal having a VHS format.

5. A multiple speed reproduction apparatus for a video signal, the multiple speed reproduction apparatus comprising:

a pattern generator portion for receiving a recording start signal and a control signal, altering a duty ratio of the control signal, generating a phase reference signal for a multiple speed reproduction which indicates a start position of a head during multiple speed reproduction, and recording the phase reference signal for the multiple speed reproduction on the control track;

a multiple speed reference signal reproduction portion for reproducing the phase reference signal for the multiple speed reproduction during the multiple speed reproduction; and a phase detection portion for receiving the phase reference signal for the multiple speed reproduction which is reproduced by said multiple speed reference signal reproduction portion and a drum phase reference signal, and detecting a phase of the phase reference signal for the multiple speed reproduction.

6. The multiple speed reproduction apparatus for a video signal according to claim 5, wherein said pattern generator portion comprises:

a ring memory which is reset by the recording start signal, and which receives the control signal as a clock signal and increases an address for every rising edge of the control signal, to thereby sequentially and cyclically output stored multiple speed information;

a down-counter which down-counts a number of predetermined clock pulses based on the rising edge of the control signal according to the multiple speed information input from said ring memory, to thereby output a pulse when the down-counted result becomes zero; and a pattern generator which outputs '1' at the rising edge of the control signal and outputs '0' according to the control signal and the pulse output by the down-counter when the down counted result becomes zero.

7. The multiple speed reproduction apparatus for a video signal according to claim 6, wherein a frequency generator signal of a VCR servo system is used as the clock signal for said down-counter.

8. The multiple speed reproduction apparatus for a video signal according to claim 5, wherein said multiple speed reference signal reproducer comprises:

a window generator for generating a window signal according to the multiplier of each multiple speed in such a manner that the window is open for a predetermined interval after the rising edge of the control signal of the multiple speed reference signal reproduced from the control track; and a window selector which receives the multiple speed information and the control signal, selects a window according to the multiple speed information among the windows generated from said window generator, and extracts the multiple speed reference signal corresponding to the multiple of each multiple speed.

9. The multiple speed reproduction apparatus for a video signal according to claim 8, wherein said window selector extracts the multiple speed reference signal of each multiple speed by detecting a falling edge of the multiple speed reference signal reproduced while the window associated with said each multiple speed is open.

* * * * *